United States Patent
Subramani et al.

(10) Patent No.: US 12,554,318 B2
(45) Date of Patent: Feb. 17, 2026

(54) ELECTRONIC DEVICE AND METHOD FOR MANAGING IOT DEVICES IN A METAVERSE ENVIRONMENT

(71) Applicant: Samsung Electronics Co., Ltd., Suwon-si (KR)

(72) Inventors: Karthikeyan Subramani, Bangalore (IN); Gokul Govindaraj, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/741,141

(22) Filed: Jun. 12, 2024

(65) Prior Publication Data

US 2025/0130626 A1 Apr. 24, 2025

Related U.S. Application Data

(63) Continuation of application No. PCT/KR2024/007491, filed on May 31, 2024.

(30) Foreign Application Priority Data

Oct. 23, 2023 (IN) .............................. 202341072341

(51) Int. Cl.
*G06F 3/01* (2006.01)
*G16Y 40/10* (2020.01)
*G16Y 40/30* (2020.01)

(52) U.S. Cl.
CPC .............. *G06F 3/011* (2013.01); *G06F 3/017* (2013.01); *G16Y 40/10* (2020.01); *G16Y 40/30* (2020.01)

(58) Field of Classification Search
CPC ......... G06F 3/011; G06F 3/017; G16Y 40/10; G16Y 40/30
See application file for complete search history.

(56) References Cited

U.S. PATENT DOCUMENTS 10,380,875 B1 * 8/2019 Roberts ................... G08B 7/06
11,501,480 B2   11/2022 McIntyre-Kirwin et al.
(Continued)

FOREIGN PATENT DOCUMENTS

JP    2022-534708 A    8/2022
KR   10-2017-0064317 A    6/2017
(Continued)

OTHER PUBLICATIONS

International Search Report dated Sep. 3, 2024, issued in International Application No. PCT/KR2024/007491.
(Continued)

*Primary Examiner* — Matthew A Eason
*Assistant Examiner* — Chayce R Bibbee
(74) *Attorney, Agent, or Firm* — Jefferson IP Law, LLP

(57) ABSTRACT

A method for managing one or more Internet of Things (IoT) devices in a metaverse environment is provided. The method includes detecting that a user is engaged in the metaverse environment, monitoring, upon detecting that the user is engaged in the metaverse environment, an operating state of each of the one or more IoT devices in a real-world environment, determining at least one IoT device from the one or more IoT devices requiring user's attention based on the monitored operating state of each of the one or more IoT, and generating, within the metaverse environment, an interactable avatar of the determined at least one IoT device requiring user's attention, wherein the interactable avatar is a representative of an operating state of the at least one IoT device.

20 Claims, 9 Drawing Sheets

(56) References Cited

U.S. PATENT DOCUMENTS

2018/0018076 A1    1/2018   Ens et al.
2018/0322380 A1   11/2018   Aggarwal
2020/0294313 A1*   9/2020   Arroyo Palacios ..... A63F 13/25

FOREIGN PATENT DOCUMENTS

| KR | 10-2020-0017577 A | 2/2020 |
| KR | 10-2022-0009244 A | 1/2022 |
| KR | 10-2022-0113248 A | 8/2022 |
| KR | 10-2023-0130434 A | 9/2023 |
| KR | 10-2024-0108837 A | 7/2024 |

OTHER PUBLICATIONS

Yiyi Shao et al., IoT Avatars: Mixed Reality Hybrid Objects for CoRe Ambient Intelligent Environments 'D3 NPL_1', The 14th International Conference on Future Networks and Communications (FNC), Aug. 19, 2019, Halifax, Canada.

\* cited by examiner

ELECTRONIC DEVICE AND METHOD FOR MANAGING IOT DEVICES IN A METAVERSE ENVIRONMENT

CROSS-REFERENCE TO RELATED APPLICATION(S)

This application is a continuation application, claiming priority under § 365(c), of an International application No. PCT/KR2024/007491, filed on May 31, 2024, which is based on and claims the benefit of an Indian patent application number 202341072341, filed on Oct. 23, 2023, in the Indian Patent Office, the disclosure of which is incorporated by reference herein in its entirety.

FIELD OF THE INVENTION

The disclosure relates to metaverse environment. More particularly, the disclosure relates to an electronic device and a method for managing one or more Internet of Things (IoT) devices in a metaverse environment.

BACKGROUND

With the advancements in technology, users use a metaverse environment to interact with each other and digital objects in a seamless manner. The metaverse environment is a virtual world shared by the users in real-time. Further, the metaverse environment represents a convergence of physical and virtual realities. For example, the metaverse environment may have a wide range of applications, such as education and training, social interaction, environment, sports and fitness, commerce and detail, and the like.

Conventionally, when a user is immersed in a metaverse session, the user is required to exit the metaverse session in case a user action is required to change an operating state of one or more IoT devices, such as vacuum cleaner, air-conditioner, and the like.

FIGS. 1A, 1B, and 1C illustrate pictorial depictions for showing one or more existing scenarios associated with a metaverse environment, according to the related art.

In the scenario illustrated in FIG. 1A, the user is shopping in a metaverse environment at 102. At 104, an IoT system determines that a fridge is frosting-up inside and generates a notification associated with the frosting. The generated notification is shared with the user on a smartphone to defrost the fridge. At 106, the user exists the metaverse session. At 108, the user defrosts the fridge.

In the scenario illustrated in FIG. 1B, the user is reading books in the metaverse environment at 110. At 112, the air-conditioner has been turned off due to an error code. The user exits the metaverse session due to discomfort at 114. At 116, the user pays attention to the air-conditioner.

In the scenario illustrated in FIG. 1C, the user is playing a game in the metaverse environment at 118. At 120, the vacuum cleaner starts cleaning the house at a scheduled time. At 122, the user is disturbed due to the house cleaning and exits the metaverse session. Accordingly, in systems of the related art, the user is required to exit the metaverse session when the one or more IoT devices require the user attention. As a result, the user is not able to finish one or more ongoing tasks in the metaverse session.

Accordingly, there is a need for a technique to overcome the above-identified problems.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a system and a method for managing one or more Internet of Things (IoT) devices in a metaverse environment.

Additional aspects will be set forth in part in the description which follows and, in part, will be apparent from the description, or may be learned by practice of the presented embodiments.

In accordance with an aspect of the disclosure, a method for managing one or more internet of things (IoT) devices by an electronic device in a metaverse environment is provided. The method includes detecting that a user is engaged in the metaverse environment, monitoring, upon detecting that the user is engaged in the metaverse environment, an operating state of each of the one or more IoT devices in a real-world environment, determining at least one IoT device from the one or more IoT devices requiring user's attention based on the monitored operating state of each of the one or more IoT devices, and generating, within the metaverse environment, an interactable avatar of the determined at least one IoT device requiring user's attention, wherein the interactable avatar is a representative of an operating state of the at least one IoT device.

In accordance with another aspect of the disclosure, an electronic device for managing one or more internet of things (IoT) devices in a metaverse environment is provided. The system includes memory storing instructions, and one or more processors communicably coupled to the memory. The instructions that, when executed by the one or more processors, cause the electronic device to detect that a user is engaged in the metaverse environment, monitor, upon detecting that the user is engaged in the metaverse environment, an operating state of each of the one or more IoT devices in a real-world environment, determine at least one IoT device from the one or more IoT devices requiring user's attention based on the monitored operating state of each of the one or more IoT devices, and generate, within the metaverse environment, an interactable avatar of the determined at least one IoT device requiring user's attention, wherein the interactable avatar is a representative of an operating state of the at least one IoT device.

In accordance with another aspect of the disclosure, one or more non-transitory computer-readable storage media storing instructions that, when executed by one or more processors of an electronic device, cause the electronic device to perform operations are provided. The operations include detecting that a user is engaged in a metaverse environment, monitoring, upon detecting that the user is engaged in the metaverse environment, an operating state of each of one or more internet of things (IoT) devices in a real-world environment, determining at least one IoT device from the one or more IoT devices requiring user's attention based on the monitored operating state of each of the one or more IoT devices, and generating, within the metaverse environment, an interactable avatar of the determined at least one IoT device requiring user's attention, wherein the interactable avatar is a representative of an operating state of the at least one IoT device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1A:
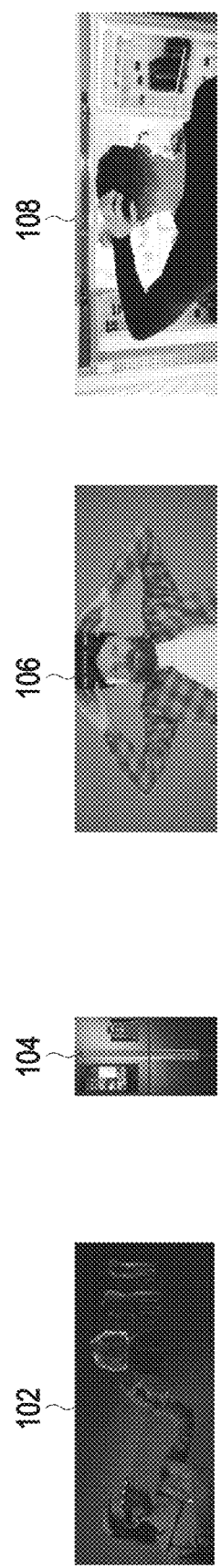
FIGS. 1A, 1B, and 1C illustrate pictorial depictions for showing one or more existing scenarios associated with a metaverse environment, according to the related art.
Figure 1B:
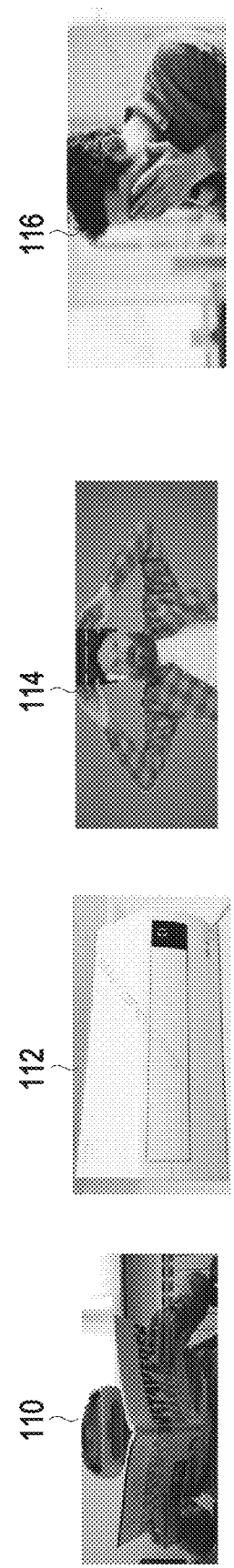
Figure 1C:
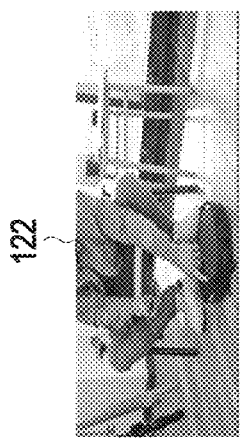
Figure 1C:
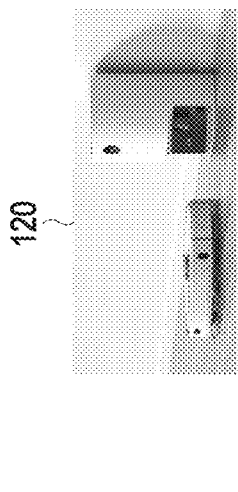
Figure 1C:
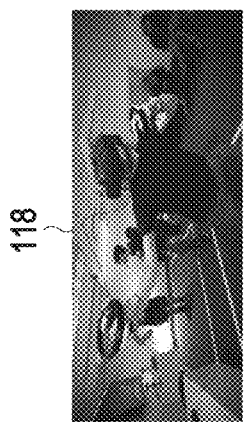

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Reference throughout this specification to "an aspect", "another aspect" or similar language means that a particular feature, structure, or characteristic described in connection with the embodiment is included in at least one embodiment of the disclosure. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an integrated circuit (IC), or the like.

Figure 2:
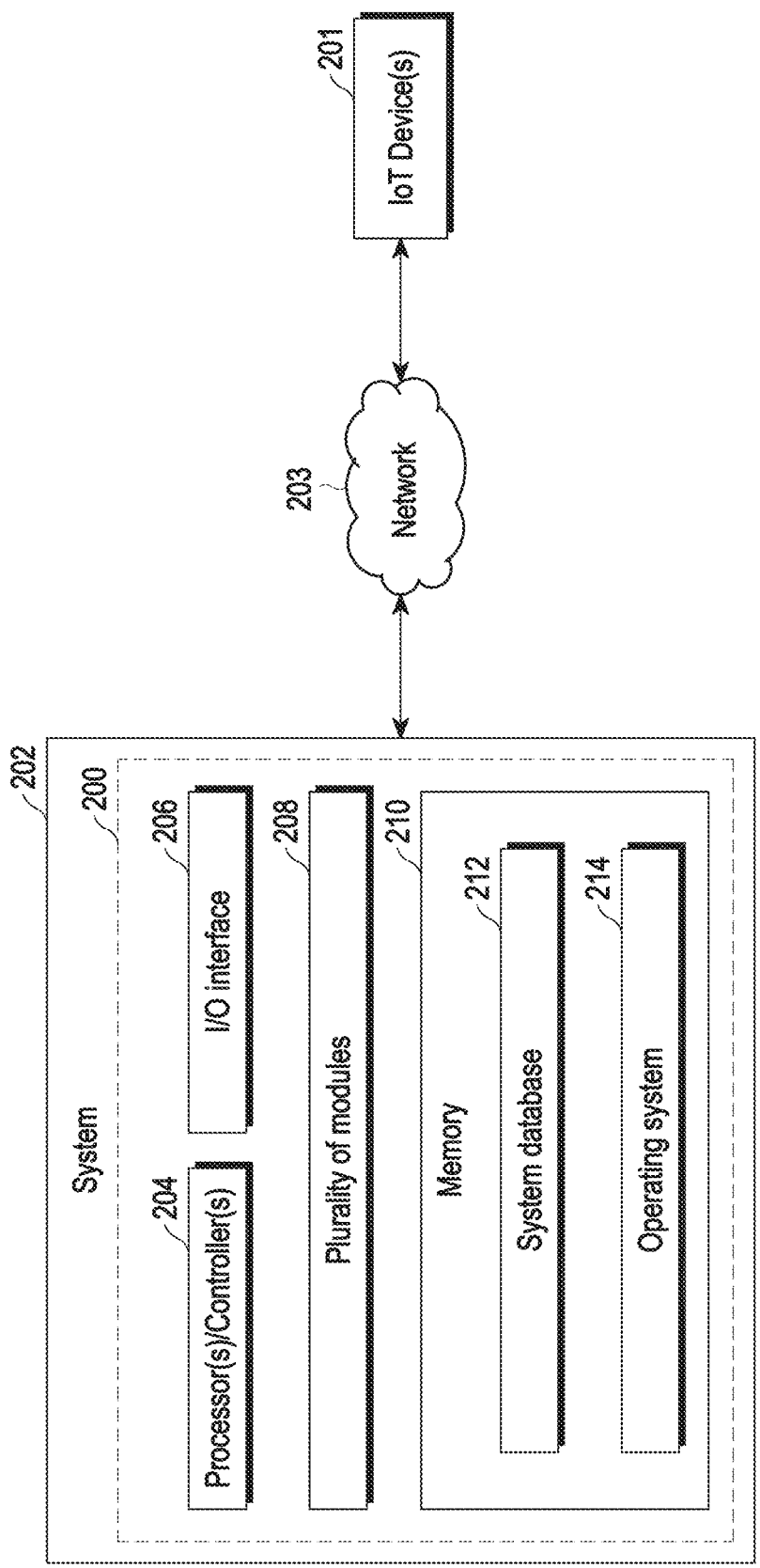
FIG. 2 illustrates a block diagram of a system for managing one or more Internet of Things (IoT) devices in a metaverse environment, according to an embodiment of the disclosure.

FIG. 2 illustrates a block diagram of a system for managing one or more Internet of Things (IoT) devices in a metaverse environment, according to an embodiment of the disclosure.

Referring to FIG. 2, the one or more IoT devices 201 are physical objects that are embedded with sensors and connectivity features, allowing the one or more IoT devices 201 to collect and exchange data with other devices and systems over the internet. For example, the one or more IoT devices 201 may include an IoT enabled refrigerator, an IoT enabled vacuum cleaner, an IoT enabled air-conditioner, and the like. According to an embodiment of the disclosure, the system 200 is implemented in an electronic device 202. The electronic device 202 may be non-IoT enabled device or IoT enabled device. An IoT enabled electronic device is an electronic gadget having a built-in internet connectivity and capability to obtain, exchange, and process the data over the internet or other networks. These electronic devices are designed to be interconnected and can communicate with other IoT devices, cloud platforms, and applications to provide a wide range of functionalities. Examples of the electronic device 202 may include, but are not limited to, a smartphone, a laptop, a camera device, a smartwatch, and the like.

According to another embodiment of the disclosure, the system may be implemented in a server, such as a cloud server or a remote server. In yet another embodiment of the disclosure, the system may be implemented in a smart hub device. The system may be implemented partially in the one or more electronic devices, the server, the smart hub device or a combination thereof.

The system implemented in the one or more electronic devices, the server, the smart hub device or a combination thereof is connected with the one or more IoT devices via a network 203. The network 203 may be any wireless network or a wired network. The wireless network may be Wi-Fi, cellular networks, Bluetooth, Zigbee, Near-Field Communication (NFC), and the like. The network 203 may be the Internet. The network 203 facilitates the exchange of data between the system 200 and the one or more IoT devices 201. For example, the system 200 may transmit one or more IoT commands to the one or more IoT devices 201, such that one or more IoT commands are executed by the one or more IoT devices 201 to update an operating state. Details on the communication between the system 200 and the one or more IoT devices 201 have been explained in further paragraphs with reference to at least FIG. 3.

The system 200 may include one or more processors/controllers 204, an Input/Output (I/O) interface 206, a plurality of modules 208, and memory 210.

The one or more processors/controllers 204 may be operatively coupled to each of the respective I/O interface 206, the plurality of modules 208, and the memory 210. The one or more processors/controllers 204 may include at least one data processor for executing processes in Virtual Storage Area Network (VSAN). The one or more processors/controllers 204 may include specialized processing units such as integrated system (bus) controllers, memory management control units, floating point units, graphics processing units, digital signal processing units, etc. In one embodiment, the one or more processors/controllers 204 may include a Central Processing Unit (CPU), a Graphics Processing Unit (GPU), or both. The one or more processors/controllers 204 may be one or more general processors, digital signal processors, application-specific integrated circuits, field-programmable gate arrays, servers, networks, digital circuits, analog circuits, combinations thereof, or other now known or later developed devices for analyzing and processing data. The one or more processors/controllers 204 may execute a software program, such as code generated manually (i.e., programmed) to perform the desired operation. The processors/controllers 204 may be a general purpose processor, such as the CPU, an Application Processor (AP), or the like, a graphics-only processing unit such as the GPU, a Visual Processing Unit (VPU), and/or an Artificial Intelligence (AI)-dedicated processor, such as a Neural Processing Unit (NPU).

The one or more processors/controllers 204 control the processing of input data in accordance with a predefined operating rule or machine learning (ML) model stored in the non-volatile memory and the volatile memory. The predefined operating rule or the ML model is provided through training or learning.

Being provided through learning means that, by applying a learning technique to a plurality of learning data, a predefined operating rule or the ML model of a desired characteristic is made. The learning may be performed in a device itself in which ML according to an embodiment is performed, and/or may be implemented through a separate server/system.

The ML model may consist of a plurality of neural network layers. Each layer has a plurality of weight values and performs a layer operation through calculation of a previous layer and an operation of a plurality of weights. Examples of neural networks include, but are not limited to, Convolutional Neural Network (CNN), Deep Neural Network (DNN), Recurrent Neural Network (RNN), Restricted Boltzmann Machine (RBM), Deep Belief Network (DBN), Bidirectional Recurrent Deep Neural Network (BRDNN), Generative Adversarial Networks (GAN), and deep Q-network.

The learning technique is a method for training a predetermined target device (for example, a robot) using a plurality of learning data to cause, allow, or control the target device to make a determination or prediction. Examples of learning techniques include, but are not limited to, supervised learning, unsupervised learning, semi-supervised learning, or reinforcement learning.

The one or more processors/controllers 204 may be disposed in communication with one or more input/output (I/O) devices via the respective I/O interface 206. The I/O interface 206 may employ communication code-division multiple access (CDMA), high-speed packet access (HSPA+), global system for mobile communications (GSM), long-term evolution (LTE), worldwide interoperability for microwave access (WiMax), or the like, etc.

The one or more processors/controllers 204 may be disposed of in communication with a communication network via a network interface. In an embodiment, the network interface may be the I/O interface 206. The network interface may connect to the communication network to enable the connection of the electronic device 202 with the other electronic devices. The network interface may employ connection protocols including, without limitation, direct connect, Ethernet (e.g., twisted pair 10/100/1000 Base T), transmission control protocol/internet protocol (TCP/IP), token ring, institute of electrical and electronics engineers (IEEE) 802.11a/b/g/n/x, etc. The communication network may include, without limitation, a direct interconnection, local area network (LAN), wide area network (WAN), wireless network (e.g., using Wireless Application Protocol), the Internet, and the like.

The one or more processors 204 may be configured to detect that a user is immersed (or engaged) in the metaverse environment. The one or more processors 204 may be configured to monitor, upon detecting that the user is immersed in the metaverse environment, an operating state of each of the one or more IoT devices 201 of the user in a real-world environment of the user. The one or more processors 204 are configured to determine at least one IoT device from the one or more IoT devices 201 requiring user's attention based on the monitored operating state of the one or more IoT devices 201. Also, the one or more processors 204 are configured to generate, within the metaverse environment, an interactable avatar of the determined at least one IoT device requiring user's attention, wherein the interactable avatar is a representative of the operating state of the at least one IoT device.

The memory 210 may be communicatively coupled to the one or more processors/controllers 204. The memory 210 may be configured to store data, and instructions executable by the one or more processors/controllers 204. The memory 210 may include, but is not limited to, a non-transitory computer-readable storage media, such as various types of volatile and non-volatile storage media including, but not limited to, random access memory, read-only memory, programmable read-only memory, electrically programmable read-only memory, electrically erasable read-only memory, flash memory, magnetic tape or disk, optical media and the like. In one example, the memory 210 may include a cache or random-access memory for the one or more processors/controllers 204. In alternative examples, the memory 210 be a part of the one or more processors/controllers 204, such as a cache memory of a processor, the system memory, or other memory. In some embodiments, the memory may be an external storage device or database for storing data. The memory 210 may be operable to store instructions executable by the one or more processors/controllers 204. The functions, acts, or tasks illustrated in the figures or described may be performed by the programmed processor/controller for executing the instructions stored in the memory 210. The functions, acts or tasks are independent of the particular type of instruction set, storage media, processor, or processing strategy and may be performed by software, hardware, integrated circuits, firmware, micro-code, and the like, operating alone or in combination. Likewise, processing strategies may include multiprocessing, multitasking, parallel processing, and the like.

The plurality of modules 208 may be included within the memory 210. The memory 210 may further include a system database 212 to store data. The plurality of modules 208 may include a set of instructions that may be executed to cause the system 200 to perform any one or more of the methods/processes disclosed herein. The plurality of modules 208 may be configured to perform the steps of the disclosure using the data stored in the system database 212 for managing the one or more IoT devices 201 in the metaverse environment, as discussed herein. In an embodiment, each of the plurality of modules 208 may be a hardware unit that may be outside the memory 210. Further, the memory 210 may include an operating system 214 for performing one or more tasks of the system 200, as performed by a generic operating system 214 in the communications domain. In one embodiment, the system database 212 may be configured to store the information as required by the plurality of modules 208 and the one or more processors/controllers 204 for managing the one or more IoT devices 201 in the metaverse environment.

At least one of the plurality of modules 208 may be implemented through the ML model. A function associated with the ML may be performed through the non-volatile memory, the volatile memory, and the one or more processors 204.

The I/O interface 206 may enable input and output to and from the system using suitable devices such as, but not limited to, a display, a keyboard, a mouse, a touch screen, a microphone, a speaker, and so forth.

The disclosure also contemplates a computer-readable medium that includes instructions or receives and executes instructions responsive to a propagated signal. The instructions may be transmitted or received over the network via a communication port or interface or using a bus (not shown). The communication port or interface may be a part of the one or more processors/controllers 204 or may be a separate component. The communication port may be created in software or may be a physical connection in hardware. The communication port may be configured to connect with a network, external media, the display, or any other components in the electronic device 202, or combinations thereof. The connection with the network may be a physical connection, such as a wired Ethernet connection, or may be established wirelessly. Likewise, the additional connections with other components of the electronic device 202 may be physical or may be established wirelessly. The network may alternatively be directly connected to the bus. For the sake of brevity, the architecture and standard operations of the operating system 214, the memory 210, the system database 212, the one or more processors/controllers 204, and the I/O interface 206 are not discussed in detail.

Figure 3:
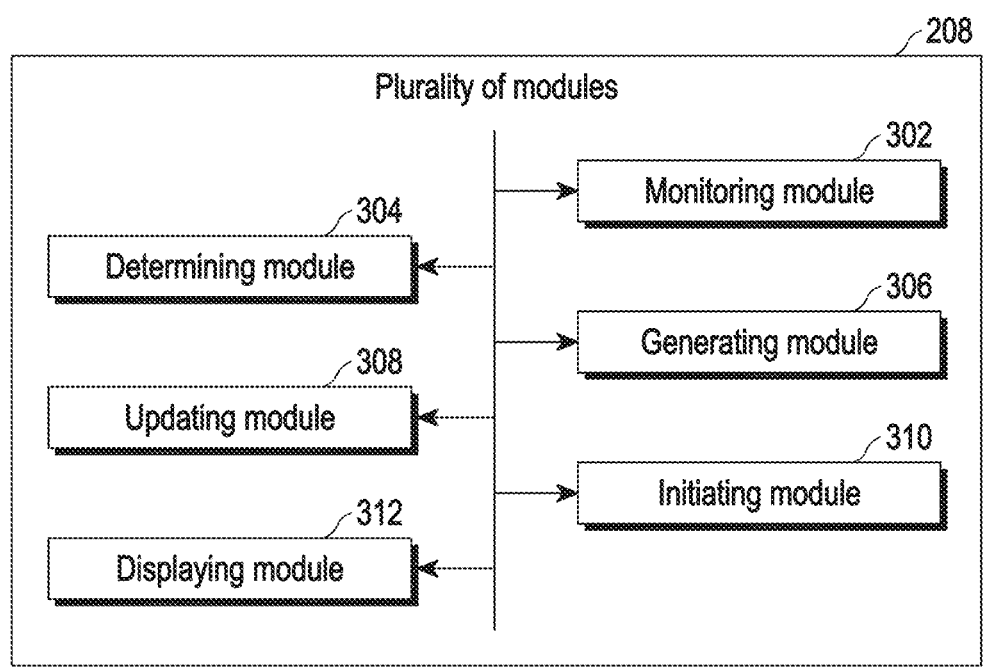
FIG. 3 illustrates a block diagram of a plurality of modules of the system for managing the one or more IoT devices in the metaverse environment, according to an embodiment of the disclosure.

FIG. 3 illustrates a block diagram of a plurality of modules of the system for managing the one or more IoT devices in the metaverse environment, according to an embodiment of the disclosure.

Referring to FIG. 3, the plurality of modules 208 may include, but is not limited to, a monitoring module 302, a determining module 304, a generating module 306, an updating module 308, an initiating module 310, and a displaying module 312. The plurality of modules 208 may be implemented by way of suitable hardware and/or software applications.

The detecting module 304 may be configured to detect that a user is immersed in the metaverse environment. The metaverse environment may correspond to a virtual or digital environment that encompasses an immersive and interconnected digital space where users may interact with each other and digital objects. The detecting module 304 may detect that the user is immersed in the metaverse environment based on whether the user is currently using a metaverse device (headset), sensor and user profile information, and the like. A Virtual Reality (VR) headset (including a sensor) may be sending events and the metaverse session may confirm the user profile that is connected with the metaverse world. In detecting that the user is immersed in the metaverse environment, the detecting module may be configured to determine if a user action is required to change the operating state of the one or more IoT devices 201 based on the determined operating state. For example, when the refrigerator is frosting inside, a user action is required to defrost the refrigerator. The detecting module may be configured to detect, upon determining that the user action is required, that the user is immersed in the metaverse environment.

The monitoring module 302 may be configured to monitor, upon detecting that the user is immersed in the metaverse environment, an operating state of each of the one or more IoT devices 201 of the user in a real-world environment of the user. In an embodiment of the disclosure, system differentiates between the one or more IoT devices 201 in the real-world environment and IoT devices in the metaverse environment to enhance the accuracy and precision of the system 200 in managing the operating state of the one or more IoT devices 201. The operating state may correspond to a current condition or mode in which the one or more IoT devices 201 are functioning. For example, the operating state may be an idle/standby mode, a sleep mode, a maintenance mode, a safe mode, ON, OFF, and the like. The real-world environment may correspond to physical, tangible surroundings and context in which the user exists and interacts.

The determining module 304 may be configured to determine at least one IoT device from the one or more IoT devices 201 requiring user's attention based on the monitored operating state of the one or more IoT devices 201.

The generating module 306 may be configured to generate, within the metaverse environment, an interactable avatar of the determined at least one IoT device requiring user's attention. The interactable avatar is a representative of the operating state of the at least one IoT device. For example, when the refrigerator is frosting inside, the interactable avatar of the refrigerator is generated. The interactable avatar of the refrigerator may be shivering to show that the refrigerator is frosting inside. In generating the interactable avatar of the determined at least one IoT device requiring user's attention, the one or more processors 204 may be configured to determine one or more device parameters associated with each of the at least one IoT device. The one or more device parameters may include temperature, speed, cooler, and the like. Further, the generating module 306 may be configured to generate, by using a virtual generation-based Artificial Intelligence (AI) model, the interactable avatar of at least one IoT device based on the determined one or more device parameters, required one or more actions, a predefined three-dimension (3D) model library, and a predefined gesture library. The predefined 3D model library may correspond to a repository of 3D objects, characters, environments, and assets that are used for generating the interactable avatar. The predefined gesture library may be a collection of pre-designed or pre-defined body movements or gestures that may be used for generating the interactable avatar.

The updating module 308 may be configured to receive, within the metaverse environment, one or more inputs from the user in the form of real-time interactions with the generated interactable avatar. In receiving the one or more inputs from the user in the form of real-time interactions with the generated interactable avatar, the updating module 308 may be configured to monitor one or more avatar movements and one or more avatar actions of the generated interactable avatar in the metaverse environment. For example, the one or more avatar movements and the one or more avatar actions may be the shivering of the refrigerator to show that the refrigerator is frosting inside.

The updating module 308 may be configured to monitor one or more user movements and one or more user actions in the metaverse environment. In an embodiment of the disclosure, the one or more user actions correspond to multi-modal actions. The multi-modal actions may correspond to actions or behaviors that involve multiple sensory modalities or input channels simultaneously, such as touch and voice input, voice command with gestures, multi-touch gestures, and the like. The system 200 may scan the metaverse environment for one or more forms of the interactable avatar and the one or more user actions that may be originating from other participating users or a central entity. The system 200 also analyzes activities (such as shivering of refrigerator to represent the frosting inside the refrigerator) performed by the at least one object located in the vicinity of the user in the metaverse environment. For example, when the interactable avatar of the refrigerator may be shivering to show that the refrigerator is frosting inside, the one or more user movements and the one or more user actions may be putting a cloth on the refrigerator in the metaverse environment to turn on the defrost mode.

In receiving the one or more inputs from the user in the form of real-time interactions with the generated interactable avatar, the updating module 308 may be configured to identify, by using a gesture detection-based AI model, one or more gestures of the user by correlating the one or more avatar movements, the one or more avatar actions, the one or more user movements, and the one or more user actions. The one or more gestures may correspond to a user intent for changing the operating state of the user. The identification of the one or more gestures avoids misinterpretation of the user intent. For example, the action of putting the cloth on the refrigerator in the metaverse environment is identified as a gesture for turning on the defrost mode of the refrigerator. The updating module 308 may also be configured to detect one or more IoT commands by correlating the identified one or more gestures with a predefined IoT command library.

The updating module 308 may be configured to update the operating state of the at least one IoT device in the real-world environment based on the received one or more inputs. For example, when the user puts the cloth on the refrigerator in the metaverse environment, the defrost mode of the refrigerator is automatically turned on. In updating the operating state of each of the at least one IoT device, the updating module 308 may be configured to transmit the detected one or more IoT commands to each of the at least one IoT device. The one or more IoT commands may be executed by the at least one IoT device to update the operating state.

The system 200 may break down the user's metaverse environment into device capabilities for acting as input at a further stage. Skeleton-based action recognition is a computer vision task that involves recognizing human actions from a sequence of 3D skeletal joint data captured as a template. By correlating the human behavior with this template may facilitate in identifying corresponding actions. Based on the action (e.g., hand shake in case of refrigerator avatar), a deforestation IOT command may be mapped and sent to the electronic device to take appropriate action. The system 200 may use the AI Model to consider the device capabilities as an input and determines whether to forward the one or more device parameters as a metaverse data to identify the best possible scenario to maximize user comfort with appropriate interaction along with the interactive avatar. In an embodiment of the disclosure, device events may be prioritized by the AI model whether the immediate user attention required for the event has occurred. The AI model may be trained with the relevant data based on the compatibility score. The AI model may decide whether the event propagation to the metaverse world is required.

The initiating module 310 may be configured to determine, upon detecting that the user is immersed in the metaverse environment, if a current task that the user is performing in the metaverse environment is a critical task or a non-critical task by analyzing one or more metaverse tasks. For example, the one or more metaverse tasks may include user is in a focused mode, attending meetings, on a call, or using one or more applications (such as a gaming application), and the like.

The initiating module 310 may be configured to determine one or more required user actions for changing the operating state of the at least one IoT device upon determining that the current task is the non-critical task. For example, when the interactable avatar of the refrigerator may be shivering to show that the refrigerator is frosting inside, the one or more required user actions is to turn on the defrost mode. The initiating module 310 may be configured to generate a compatibility score associated with each of the one or more required user actions based on a predefined priority list and the monitored operating state. The predefined list may include a weightage of each of tasks to be performed by the user in the metaverse environment. The compatibility score may represent a priority of performing the one or more user required actions with respect to a criticality of the current task. The initiating module 310 may be configured to determine if the generated compatibility score is greater than a predefined threshold score. The initiating module 310 may also be configured to initiate, upon determining that the generated compatibility score is greater than the predefined threshold score, a metaverse session for changing the operating state of the at least one IoT device.

The displaying module 312 may be configured to generate, by using the virtual generation-based AI model, a metaverse representation of the operating state in the metaverse environment based on the determined one or more device parameters, the required one or more actions, the predefined 3D model library, and the predefined gesture library. The operating state may represent one or more actions to be performed by each of the at least one IoT device in the metaverse environment. The displaying module 312 may be configured to correlate the generated interactable avatar and the generated metaverse representation of the operating state. The displaying module 312 may be configured to display the generated interactable avatar and the metaverse representation of the operating state upon correlation. For example, when the refrigerator is frosting inside, the metaverse representation of the frosting state of the refrigerator in the metaverse environment is shivering of the refrigerator. Details on other modules of the system (such as a select character engine, a real world event router, and the like) along with the operation of the system 200 for managing the one or more IoT devices 201 in the metaverse environment are described below with reference to at least FIGS. 4A, 4B, 5A, and 5B.

Figure 4A:
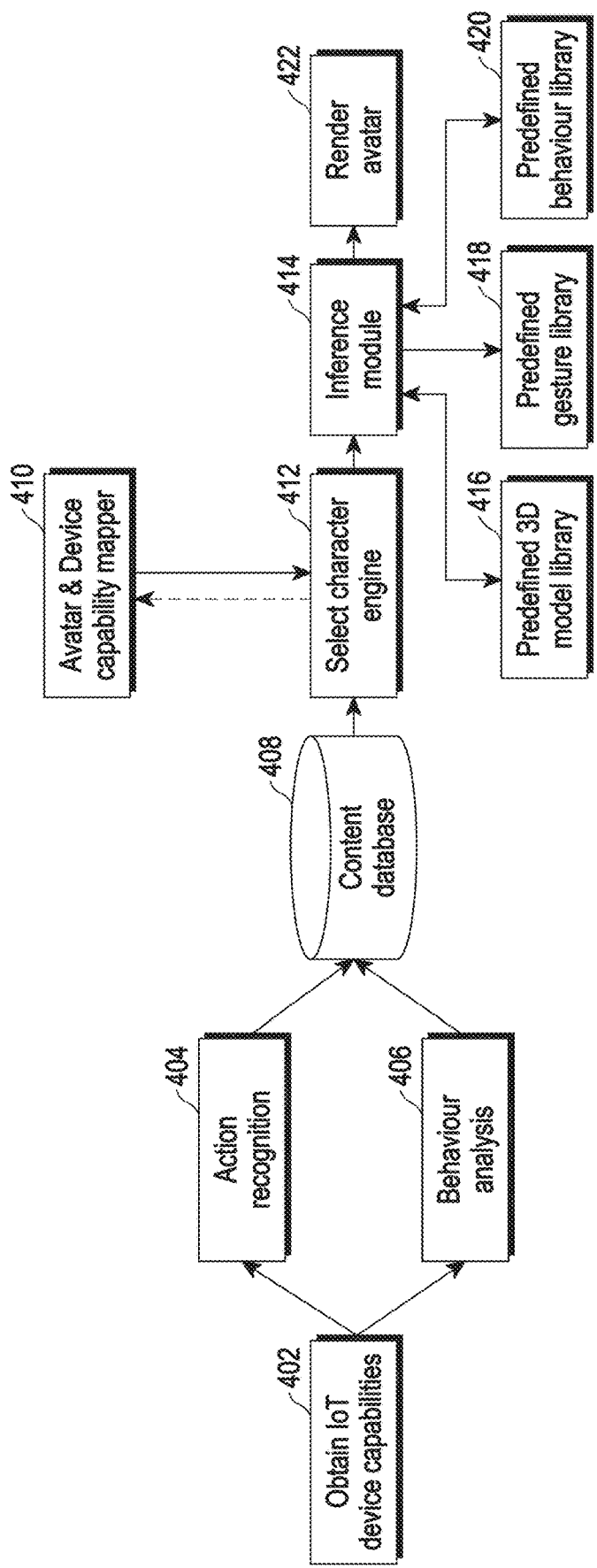
FIGS. 4A and 4B illustrate a block diagram of an operation of the system for managing the one or more IoT devices in the metaverse environment, according to various embodiments of the disclosure.
Figure 4B:
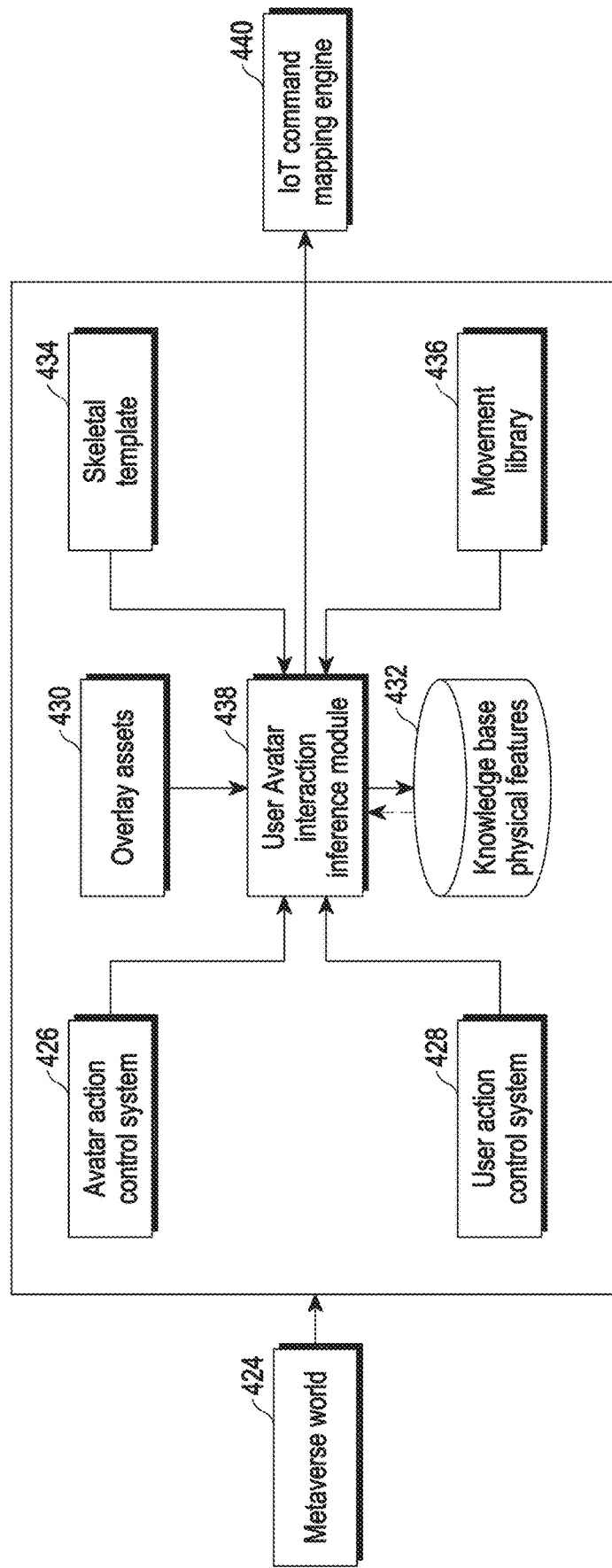

FIGS. 4A and 4B illustrate a block diagram of an operation of the system for managing the one or more IoT devices in the metaverse environment, according to various embodiments of the disclosure. For the sake of brevity, FIGS. 4A and 4B are explained together. As explained with reference to at least FIGS. 2 and 3, the plurality of modules 208 of the system 200 facilitates management of the one or more IoT devices 201 in the metaverse environment.

FIG. 4A illustrates a block diagram for generating the interactable avatar of the at least one IoT device.

Referring to FIG. 4A, the system 200 obtains device capabilities of the at least one IoT device, at operation 402. Device capabilities may include type of the least one IoT device, a current operating state of the least one IoT device, the required change in the least one IoT device, and the like. Further, the system 200 selects the interactable avatar of the at least one IoT device based on the obtained device capabilities.

At operation 404, the one or more required actions of the at least IoT devices are determined based on the obtained device capabilities. The system 200 identifies relevant attributes associated with the identified one or more required actions to be attached with the interactable avatar. At operation 406, the system 200 determines relevant behavior of the at least one IoT device to be attached with the interactable avatar (such as shivering, suffocation, and the like) based on the obtained device capabilities. The relevant attributes and the relevant behavior may correspond to the metaverse representation of the operating state in the metaverse environment. Further, the identified relevant attributes and the determined relevant behavior of the at least one IoT device are stored in a content database 408.

At operation 410, an avatar and device capability mapper of the system 200 maps the device capabilities with the relevant attributes and the relevant behavior of the at least one IoT device. Further, at operation 412, the select character engine of the system 200 selects the interactable avatar based on the result of operation 410. At operation 414, an inference module/the generating module 306 uses the predefined 3D model library 416, the predefined gesture library 418, and a predefined behavior library 420 to generate 3D model features associated with the interactable avatar. At operation 422, the interactable avatar is rendered based on the generated 3D model features.

FIG. 4B illustrates a block diagram for facilitating the interaction between the user in the metaverse session and the one or more IoT devices 201 in the real-world environment.

Referring to FIG. 4B, the user interacts with the rendered interactable avatar in the metaverse environment, at operation 424. At operation 426, an Avatar Action Control System (AACS) of the system 200 monitors the one or more avatar actions and the one or more avatar movements of the interactable avatar. At operation 428, a User Action Control System (UACS) of the system 200 monitors the one or more user actions and the one or more user movements in the metaverse environment. At operation 430, the predefined gesture library is stored alongside potential overlay assets in the database. The user may be provided with a list of possible body parts taken from the different available characters. When a selection is made, an avatar skeleton is updated by loading in that asset.

A database 432 may store knowledge base physical features of the interactable avatar. The system may combine avatars (graphical representations of users or characters) with a knowledge base (a repository of information). The knowledge base is used to provide users with a more interactive and visually engaging way to access information. A skeletal template 434 may be used to identify the gesture of the interactable avatar based on the interaction between the interactable avatar and the at least one IoT device. In an embodiment of the disclosure, the identified gesture may be mapped with a respective IoT command. The system 200 may identify the user gesture with the help of a movement library 436 by using the one or more actions performed by the interactable avatar. In an embodiment of the disclosure, the creation of a reusable avatar focuses on the implementation of defined movement sequences in each case, so that commonalities can be exploited between different characters. For example, any avatar with arms and hands can perform a general waving gesture, while avatar head movements may vary in speed and distance but still retain common direction.

At operation 438, a user avatar interaction inference module/the updating module 308 identifies the one or more gestures of the user by correlating the one or more avatar movements, the one or more avatar actions, the one or more user movements, and the one or more user actions. At operation 440, an IoT command mapping engine/the updating module 308 is configured to detect the one or more IoT commands by correlating the identified one or more gestures with the predefined IoT command library.

Figure 5A:
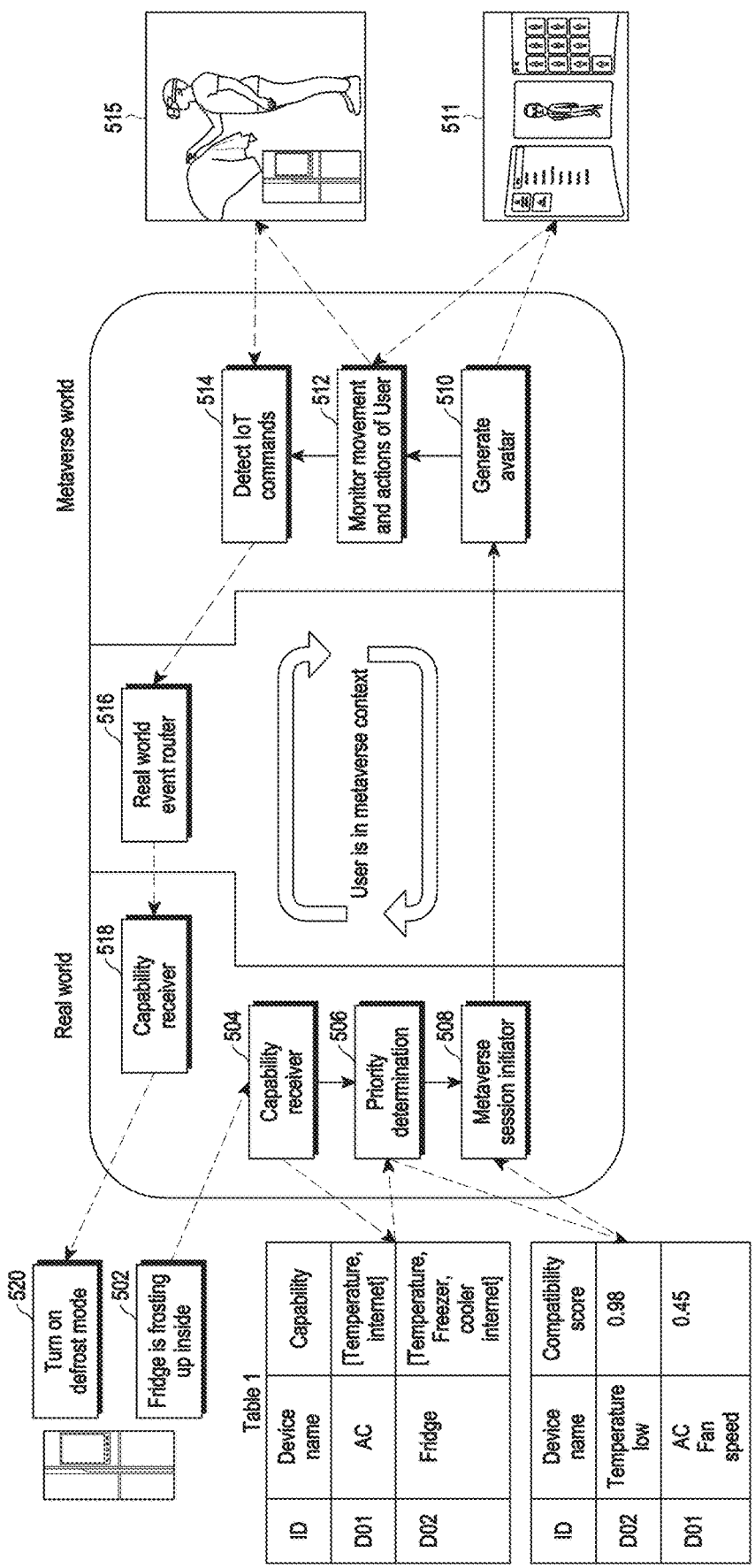
FIGS. 5A and 5B illustrate pictorial depictions of use-case scenarios for managing the one or more IoT devices in the metaverse environment, according to various embodiments of the disclosure.
Figure 5B:
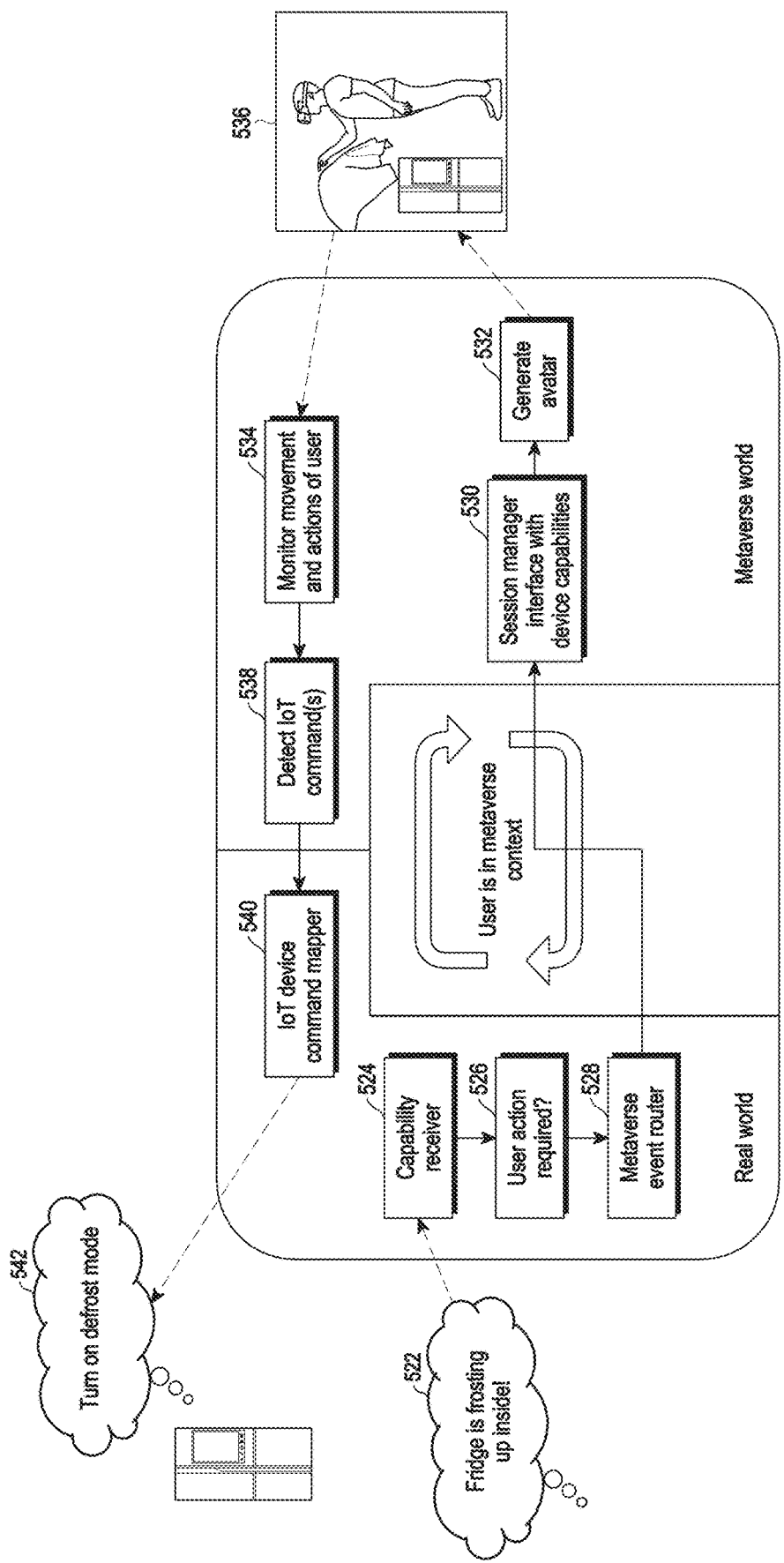

FIGS. 5A and 5B illustrate pictorial depictions of use-case scenarios for managing the one or more IoT devices 201 in the metaverse environment, according to various embodiments of the disclosure. As explained with reference to at least FIGS. 2 and 3, the plurality of modules 208 of the system 200 facilitates management of the one or more IoT devices 201 in the metaverse environment.

FIG. 5A shows the use-case scenario of the system 200 for facilitating interaction between the user in the metaverse session and a refrigerator in the real-world environment.

Referring to FIG. 5A, at operation 502, the refrigerator/fridge starts frosting-up inside. At operation 504, a capability receiver/the updating module 308 may the receive the device capabilities. The device capabilities are shown in Table 1. Further, the initiating module 310 may determine if a current task that the user is performing in the metaverse environment is the critical task or the non-critical task by analyzing the one or more metaverse tasks, at operation 506. A metaverse session initiator of the system 200 determines that the user in a metaverse environment and initiates the metaverse session, at operation 508. The system 200 may generate a compatibility score associated with each of the one or more required user actions for changing the operating state of the one or more IoT devices 201, as shown in Table 2.

At operation 510, the generating module 306 generates the interactable avatar of the at least one IoT device based on the received device capabilities. For example, the interactable avatar may be a three-dimensional (3D) avatar 511. At operation 512, the updating module 308 monitors the one or more user movements and the one or more user actions in the metaverse environment. In the current scenario, the one or more user actions is to put a cloth on the interactable avatar of the refrigerator to turn on the defrost mode of the refrigerator. At operation 514, the updating module 308 detects the one or more IoT commands based on the result of monitoring the one or more user movements and the one or more user actions. In the current scenario, the one or more user actions is to put a cloth on the interactable avatar of the refrigerator to turn on the defrost mode of the refrigerator, as shown at 515. The real world event router 516 of the system 200 transmits the one or more IoT commands to an IoT device command mapper 518 of the system 200. The IoT device command mapper (capability receiver) 518 transmits the one or more IoT commands to the at least one IoT device, such that the at least IoT device updates the operating state. In the current scenario, the fridge automatically turns on the defrost mode based on the received one or more IoT commands, at operation 520.

In another use case scenario, the user is shopping in the metaverse world, while the fridge is frosting up inside. The system 200 obtains the device capabilities of the fridge and identifies the priority of the ongoing task that the user is performing in the metaverse session. The system 200 generates the interactable avatar of the fridge and notifies the user. The system 200 then converts the user action to a command which the fridge may execute. In the current scenario, the user takes the cloth and covers the fridge in the existing metaverse session to turn on the defrost mode in the fridge. The fridge automatically turns on the defrost mode based on the action of the user.

In yet another use case scenario, the user is reading a book in a metaverse session, and an air-conditioner is turned off with an error code (auto-cleaning is required). The system 200 obtains the device capabilities of the air-conditioner and identifies the priority of the ongoing task that the user is performing in the metaverse session. The system 200 generates the interactable avatar of the air-conditioner (i.e., a person feeling cold) and notifies the user. The system 200 then converts the user action to command that the air-conditioner may execute. In the current scenario, the user takes the cloth and wipes the face of the interactable avatar in the existing metaverse session to turn on the auto-cleaning mode in the air-conditioner. The air-conditioner automatically turns on the auto-cleaning mode.

In yet another use case scenario, the user is busy in a meeting, but a robot cleaner (vacuum cleaner) is about to start which may disturb the meeting. The system 200 obtains the device capabilities of the robot cleaner and identifies the priority of the ongoing task that the user is performing in the metaverse session. The system 200 generates the interactable avatar of the robot cleaner and notifies the user. The system 200 then converts the user action to command that the robot-cleaner may execute. In the current scenario, the user performs a stop action in the existing metaverse session to turn off the robot cleaner. Accordingly, the robot cleaner automatically turns off and stops cleaning.

FIG. 5B illustrates a pictorial depiction for facilitating interaction between the user in the metaverse session and the refrigerator in the real-world environment.

Referring to FIG. 5B, at operation 522, the refrigerator/fridge starts frosting-up inside. At operation 524, the capability receiver/the updating module 308 may the receive the device capabilities. The initiating module 310 determines if the user action is required for the event (i.e., the refrigerator/fridge starts frosting-up inside), at operation 526. A metaverse event router of the system 200 connects the real-word environment and the metaverse environment and the initiates the metaverse session, at operation 528. A session manager interface of the system 200 manages the metaverse session based on the device capabilities, at operation 530. At operation 532, the generating module 306 generates the interactable avatar of the refrigerator based on the received device capabilities. At operation 534, the updating module 308 monitors the one or more user movements and the one or more user actions in the metaverse environment. In the current scenario, the one or more user actions is to put a cloth on the interactable avatar of the refrigerator to turn on the defrost mode of the refrigerator, as shown at 536. At operation 538, the updating module 308 detects the one or more IoT commands based on the result of monitoring the one or more user movements and the one or more user actions. An IoT device command mapper 540 of the system 200 transmits the one or more IoT commands to the at least one IoT device, such that the at least IoT device updates the operating state. In the current scenario, the fridge automatically turns on the defrost mode based on the received one or more IoT commands, at operation 542.

Figure 6:
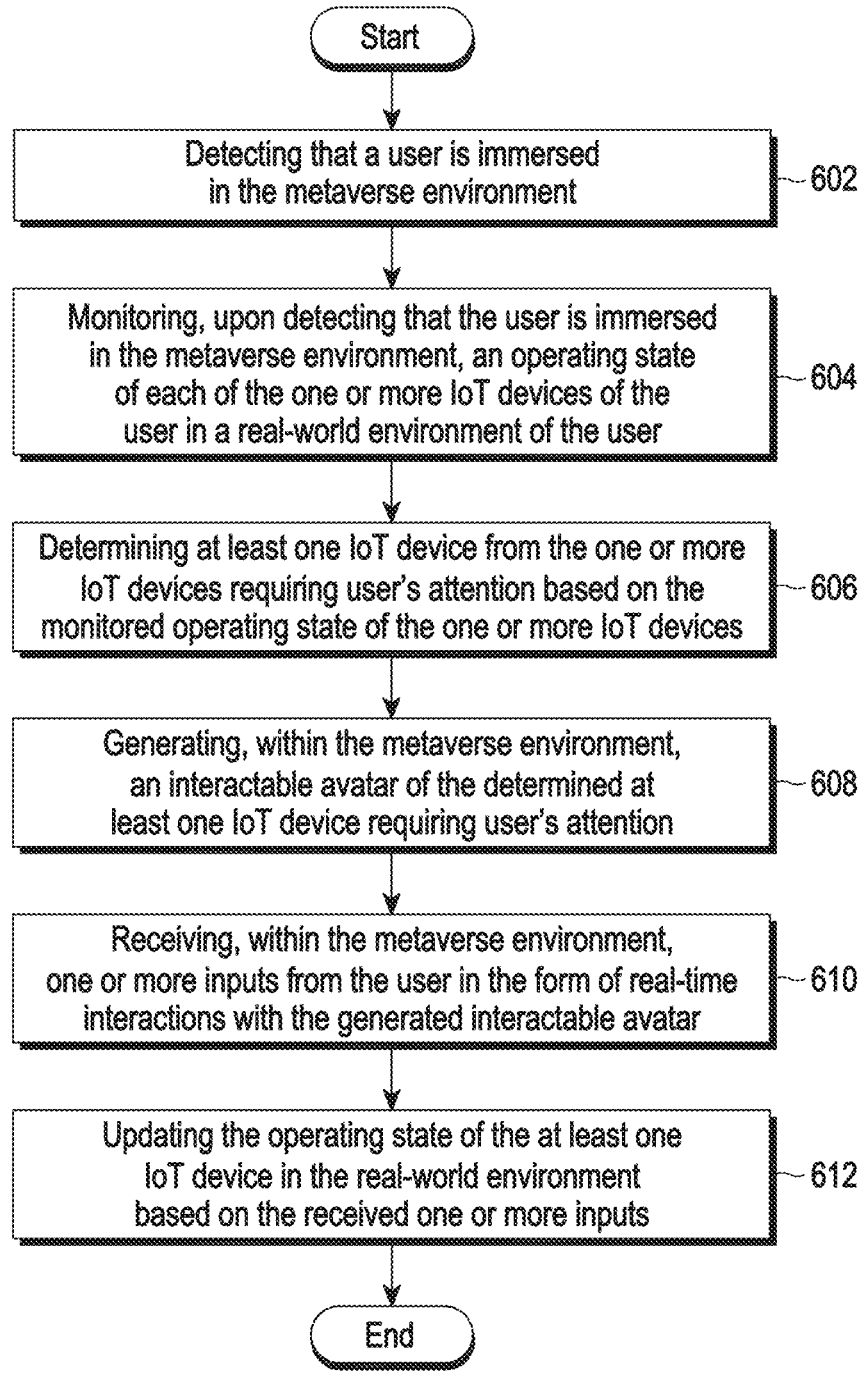
FIG. 6 illustrates a process flow depicting a method for managing the one or more IoT devices in the metaverse environment, according to an embodiment of the disclosure.

FIG. 6 illustrates a process flow depicting a method for managing the one or more IoT devices in the metaverse environment, according to an embodiment of the disclosure.

Referring to FIG. 6, the method 600 may be performed by a system 200 implemented in the electronic device 202, as shown in FIGS. 2 and 3.

At operation 602, the method 600 includes detecting that a user is immersed in the metaverse environment.

At operation 604, the method 600 includes monitoring, upon detecting that the user is immersed in the metaverse environment, an operating state of each of the one or more IoT devices 201 of the user in a real-world environment of the user.

At operation 606, the method 600 includes determining at least one IoT device from the one or more IoT devices 201 requiring user's attention based on the monitored operating state of the one or more IoT devices 201.

At operation 608, the method 600 includes generating, within the metaverse environment, an interactable avatar of the determined at least one IoT device requiring user's attention. In an embodiment of the disclosure, the interactable avatar is a representative of the operating state of the at least one IoT device.

At operation 610, the method 600 includes receiving, within the metaverse environment, one or more inputs from the user in the form of real-time interactions with the generated interactable avatar. In receiving the one or more inputs from the user, the method 600 includes monitoring one or more avatar movements and one or more avatar actions of the generated interactable avatar in the metaverse environment. The method 600 may include monitoring one or more user movements and one or more user actions in the metaverse environment, wherein the one or more user actions correspond to multi-modal actions. The method 600 may include identifying, by using a gesture detection-based AI model, one or more gestures of the user by correlating the one or more avatar movements, the one or more avatar actions, the one or more user movements and the one or more user actions. The method 600 may also include detecting one or more IoT commands by correlating the identified one or more gestures with a predefined IoT command library.

At operation 612, the operating state of the at least one IoT device in the real-world environment is updated based on the received one or more inputs, at 612. Updating the operating state of the at least one IoT device, may include transmitting the detected one or more IoT commands to each of the at least one IoT device. The one or more IoT commands may be executed by the at least one IoT device to update the operating state.

While the above operations shown in FIG. 6 are described in a particular sequence, the operations may occur in variations to the sequence in accordance with various embodiments of the disclosure. Further, the details related to various operations of FIG. 6, which are already covered in the description related to FIGS. 1A to 1C, 2, 3, 4A, 4B, 5A, and 5B are not discussed again in detail here for the sake of brevity.

The disclosure provides for various technical advancements based on the key features discussed above. The disclosure generates, within the metaverse environment, the interactable avatar of the at least one IoT device requiring the user's attention. The disclosure detects the one or more IoT commands to be executed by the one or more IoT devices 201 for updating the operating state of each of the at least one IoT device. Since, the disclosure allows the user to change the operating state of each of the at least one IoT device without existing the current metaverse session, the user is able to finish one or more metaverse tasks (such as playing game, attending a meeting, and the like) in the current metaverse session.

The plurality of modules 208 may be implemented by any suitable hardware and/or set of instructions. Further, the sequential flow illustrated in FIG. 2 is exemplary in nature and the embodiments may include addition/omission of steps as per the requirement. In some embodiments, the one or more operations performed by the plurality of modules 208 may be performed by the processor/controller based on the requirement.

It will be appreciated that various embodiments of the disclosure according to the claims and description in the specification can be realized in the form of hardware, software or a combination of hardware and software.

Any such software may be stored in non-transitory computer readable storage media. The non-transitory computer readable storage media store one or more computer programs (software modules), the one or more computer programs include computer-executable instructions that, when executed by one or more processors of an electronic device, cause the electronic device to perform a method of the disclosure.

Any such software may be stored in the form of volatile or non-volatile storage such as, for example, a storage device like read only memory (ROM), whether erasable or rewritable or not, or in the form of memory such as, for example, random access memory (RAM), memory chips, device or integrated circuits or on an optically or magnetically readable medium such as, for example, a compact disk (CD), digital versatile disc (DVD), magnetic disk or magnetic tape or the like. It will be appreciated that the storage devices and storage media are various embodiments of non-transitory machine-readable storage that are suitable for storing a computer program or computer programs comprising instructions that, when executed, implement various embodiments of the disclosure. Accordingly, various embodiments provide a program comprising code for implementing apparatus or a method of any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for managing one or more internet of things (IoT) devices performed by an electronic device in a metaverse environment, the method comprising:
   detecting that a user is engaged in the metaverse environment;
   monitoring, upon detecting that the user is engaged in the metaverse environment, an operating state of each of the one or more IoT devices in a real-world environment;
   determining at least one IoT device, from the one or more IoT devices, being in a state that requires attention of the user, based on the monitored operating state of each of the one or more IoT devices; and
   in response to the determining of the at least one IoT device being in the state that requires the attention of the user, generating, within the metaverse environment, an interactable avatar of the determined at least one IoT device being in the state that requires the attention of the user, wherein the interactable avatar is a representative of an operating state of the at least one IoT device.

2. The method of claim 1, further comprising:
   receiving, within the metaverse environment, one or more inputs from the user in a form of real-time interactions with the generated interactable avatar; and
   updating the operating state of the at least one IoT device in the real-world environment based on the received one or more inputs.

3. The method of claim 2, wherein the receiving of the one or more inputs from the user in the form of real-time interactions with the generated interactable avatar comprises:
   monitoring one or more avatar movements and one or more avatar actions of the generated interactable avatar in the metaverse environment; and
   monitoring one or more user movements and one or more user actions in the metaverse environment, wherein the one or more user actions correspond to multi-modal actions.

4. The method of claim 3, wherein the receiving of the one or more inputs from the user in the form of real-time interactions with the generated interactable avatar comprises:
   identifying, by using a gesture detection-based artificial intelligence (AI) model, one or more gestures of the user by correlating the one or more avatar movements, the one or more avatar actions, the one or more user movements, and the one or more user actions; and
   detecting one or more IoT commands by correlating the identified one or more gestures with a predefined IoT command library.

5. The method of claim 4, wherein the updating of the operating state of the at least one IoT device comprises:
   transmitting the detected one or more IoT commands to each of the at least one IoT device, wherein the one or more IoT commands are executed by the at least one IoT device to update the operating state.

6. The method of claim 1, wherein the detecting that the user is engaged in the metaverse environment comprises:

determining if a user action is required to change the operating state of the one or more IoT devices based on the determined operating state; and detecting, upon determining that the user action is required, that the user is engaged in the metaverse environment.

7. The method of claim 1, further comprising:

determining, upon detecting that the user is engaged in the metaverse environment, if a current task that the user is performing in the metaverse environment is one of a critical task or a non-critical task by analyzing one or more metaverse tasks; and determining one or more required user actions for changing the operating state of the at least one IoT device upon determining that the current task is the non-critical task.

8. The method of claim 7, further comprising:

generating a compatibility score associated with each of the one or more required user actions based on a predefined priority list and the monitored operating state, wherein the compatibility score represents a priority of performing the one or more user required actions with respect to a criticality of the current task;

determining if the generated compatibility score is greater than a predefined threshold score; and initiating, upon determining that the generated compatibility score is greater than the predefined threshold score, a metaverse session for changing the operating state of the at least one IoT device.

9. The method of claim 1, wherein the generating of the interactable avatar of the determined at least one IoT device being in the state that requires the attention of the user, the method comprises:

determining one or more device parameters associated with each of the at least one IoT device; and generating, by using a virtual generation-based artificial intelligence (AI) model, the interactable avatar of at least one IoT device based on the determined one or more device parameters, required one or more actions, a predefined three-dimension (3D) model library, and a predefined gesture library.

10. The method of claim 9, further comprising:

generating, by using the virtual generation-based AI model, a metaverse representation of the operating state in the metaverse environment based on the determined one or more device parameters, the required one or more actions, the predefined 3D model library, and the predefined gesture library, wherein the operating state represents one or more actions to be performed by each of the at least one IoT device in the metaverse environment;

correlating the generated interactable avatar and the generated metaverse representation of the operating state; and displaying the generated interactable avatar and the metaverse representation of the operating state upon correlation.

11. An electronic device for managing one or more internet of things (IoT) devices in a metaverse environment, the electronic device comprising:

memory storing instructions; and one or more processors communicably coupled to the memory, wherein the instructions, when executed by the one or more processors individually or collectively, cause electronic device to:

detect that a user is engaged in the metaverse environment, monitor, upon detecting that the user is engaged in the metaverse environment, an operating state of each of the one or more IoT devices in a real-world environment, determine at least one IoT device from the one or more IoT devices, being in a state that requires attention of the user, based on the monitored operating state of each of the one or more IoT devices, and in response to the determining of the at least one IoT device being in the state that requires the attention of the user, generate, within the metaverse environment, an interactable avatar of the determined at least one IoT device being in the state that requires the attention of the user, wherein the interactable avatar is a representative of an operating state of the at least one IoT device.

12. The electronic device of claim 11, wherein the instructions that, when executed by the one or more processors individually or collectively, cause the electronic device to:

receive, within the metaverse environment, one or more inputs from the user in a form of real-time interactions with the generated interactable avatar, and update the operating state of the at least one IoT device in the real-world environment based on the received one or more inputs.

13. The electronic device of claim 12, wherein for receiving the one or more inputs from the user in the form of real-time interactions with the generated interactable avatar, the instructions that, when executed by the one or more processors individually or collectively, cause the electronic device to:

monitor one or more avatar movements and one or more avatar actions of the generated interactable avatar in the metaverse environment, and monitor one or more user movements and one or more user actions in the metaverse environment, wherein the one or more user actions correspond to multi-modal actions.

14. The electronic device of claim 13, wherein the instructions that, when executed by the one or more processors individually or collectively, cause the electronic device to:

identify, by using a gesture detection-based artificial intelligence (AI) model, one or more gestures of the user by correlating the one or more avatar movements, the one or more avatar actions, the one or more user movements, and the one or more user actions, and detect one or more IoT commands by correlating the identified one or more gestures with a predefined IoT command library.

15. The electronic device of claim 11, wherein for detecting that the user is immersed engaged in the metaverse environment, the instructions that, when executed by the one or more processors individually or collectively, cause the electronic device to:

determine if a user action is required to change the operating state of the one or more IoT devices based on the determined operating state, and detect, upon determining that the user action is required, that the user is engaged in the metaverse environment.

16. The electronic device of claim 11, wherein the instructions that, when executed by the one or more processors individually or collectively, cause the electronic device to:

determine, upon detecting that the user is engaged in the metaverse environment, if a current task that the user is performing in the metaverse environment is one of a critical task or a non-critical task by analyzing one or more metaverse tasks, and determine one or more required user actions for changing the operating state of the at least one IoT device upon determining that the current task is the non-critical task.

17. The electronic device of claim 16, wherein the instructions that, when executed by the one or more processors individually or collectively, cause the electronic device to:

generate a compatibility score associated with each of the one or more required user actions based on a predefined priority list and the monitored operating state, wherein the compatibility score represents a priority of performing the one or more user required actions with respect to a criticality of the current task, determine if the generated compatibility score is greater than a predefined threshold score, and initiate, upon determining that the generated compatibility score is greater than the predefined threshold score, a metaverse session for changing the operating state of the at least one IoT device.

18. The electronic device of claim 11 wherein the instructions that, when executed by the one or more processors individually or collectively, cause the electronic device to:

determine one or more device parameters associated with each of the at least one IoT device, and generate, by using a virtual generation-based Artificial Intelligence (AI) model, the interactable avatar of at least one IoT device based on the determined one or more device parameters, required one or more actions, a predefined three-dimension (3D) model library, and a predefined gesture library.

19. The electronic device of claim 18, wherein the instructions that, when executed by the one or more processors individually or collectively, cause the electronic device to:

generate, by using the virtual generation-based AI model, a metaverse representation of the operating state in the metaverse environment based on the determined one or more device parameters, the required one or more actions, the predefined 3D model library, and the predefined gesture library, wherein the operating state represents one or more actions to be performed by each of the at least one IoT device in the metaverse environment, correlate the generated interactable avatar and the generated metaverse representation of the operating state, and display the generated interactable avatar and the metaverse representation of the operating state upon correlation, wherein the instructions that, when executed by the one or more processors individually or collectively, cause the electronic device to:

map device capabilities of the at least one IoT device to relevant attributes and relevant behavior of the at least one IoT device, and select, based on the mapping, an interactable avatar to be generated, and wherein the instructions that, when executed by the one or more processors individually or collectively, cause the electronic device to:

update an avatar skeleton based on interactions between the user and the generated interactable avatar.

20. One or more non-transitory computer-readable storage media storing instructions that, when executed by one or more processors of an electronic device individually or collectively, cause the electronic device to perform operations, the operations comprising:

detecting that a user is engaged in a metaverse environment;

monitoring, upon detecting that the user is engaged in the metaverse environment, an operating state of each of one or more internet of things (IoT) devices in a real-world environment;

determining at least one IoT device from the one or more IoT devices being in a state that requires attention of the user, based on the monitored operating state of each of the one or more IoT devices; and in response to the determining of the at least one IoT device being in the state that requires the attention of the user, generating, within the metaverse environment, an interactable avatar of the determined at least one IoT device being in the state that requires the attention of the user, wherein the interactable avatar is a representative of an operating state of the at least one IoT device.

* * * * *